May 31, 1938. J. E. BROWN 2,119,417
FISH LURE
Filed Oct. 10, 1936

Inventor
John E. Brown.

By Lacey & Lacey, Attorneys

Patented May 31, 1938

2,119,417

UNITED STATES PATENT OFFICE 2,119,417

FISH LURE

John Emmett Brown, Amherst, Ohio, assignor of one-half to Fred Herman Gasser, Amherst, Ohio Application October 10, 1936, Serial No. 105,135

2 Claims. (Cl. 43—46)

This invention relates to fish lures and more particularly to a lure especially designed to simulate the movements of a live minnow.

The object of the invention is to provide a lure or artificial bait of simple and inexpensive construction which will appear animated or alive when drawn through the water and thus tend to attract all kinds of game fish.

A still further object of the invention is generally to improve this class of devices so as to increase their utility, durability and efficiency.

In the accompanying drawing forming a part of this specification and in which similar numerals of reference indicate corresponding parts, Figure 1 is a side elevation of an artificial bait or lure constructed in accordance with the present invention.

Figure 1:
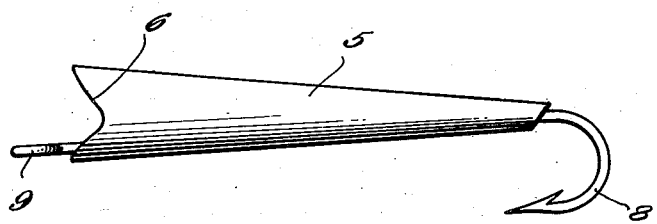
Figure 2:
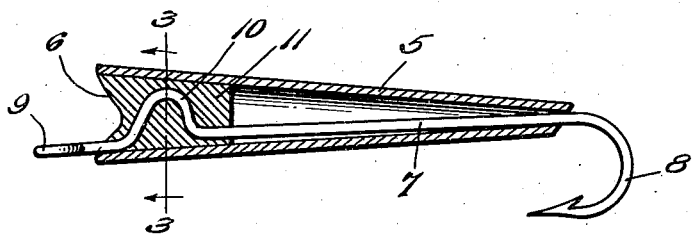
Figure 2 is a sectional view taken longitudinally through the bait with the hook shown in elevation.
Figure 3:
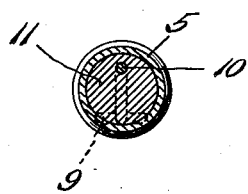
Figure 3 is a transverse section taken along the line 3—3 of Figure 2.

The improved fish lure constituting the subject-matter of the present invention comprises a hollow rearwardly tapered body 5 preferably formed from a portion of the quill of a feather, although other materials found suitable may be used, said body being initially open at its front and rear ends and having its front end cut at opposite sides to form a recess 6 which tapers rearwardly and simulates the open mouth of a minnow when the bait is viewed as shown in Figure 1. A hook 7 extends longitudinally through the body with its bill or barbed rear end portion 8 depending at the rear end of the body and its line-engaging eye 9 protruding from the lower portion of the mouth-shaped front end of the body. The shank of the hook is bent adjacent its front end to form a substantially inverted U-shaped hump 10 extending transversely within the large forward end portion of the body 5 and anchored therein by a small quantity of plastic wood or other suitable material 11 so as to prevent both rotary and longitudinal sliding movement of the hook within the body. The rear portion of the shank of the hook which extends through the small opening in the tapered rear end of the body substantially fills this opening while the large forward end of the body is closed by the filler 11 which has its exposed front end shaped to conform to the outline of the recess 6 and cooperate therewith to impart a very effective simulation of the open mouth of a live minnow.

From the foregoing description, it is thought that the construction and operation of the device will be readily understood by those skilled in the art and further description thereof is deemed unnecessary. It will be understood, however, that the lures may be made in different sizes and shapes and painted or otherwise colored or ornamented to give them a neat and attractive appearance.

Having thus described the invention, what is claimed as new is:

1. A fish lure comprising a tapered body portion fashioned from a natural quill and having its small end open and its walls at the large end thereof provided with a substantially V-shaped recess in simulation of the open mouth of a minnow, a hook having a shank disposed within the body portion and a barb projecting through the small end of said body portion, said shank being provided with a lateral hump arranged near the V-shaped recess, anchoring material disposed within the body portion and surrounding said hump, and means on the shank adjacent the hump for attachment to a fishing line.

2. A fish lure comprising a rearwardly tapered body portion having its small rear end open and its walls at the large front end thereof provided with a substantially V-shaped recess in simulation of the open mouth of a minnow, a hook having a shank disposed within the body portion longitudinally thereof and a barb projecting from the rear end of the shank through the small end of said body portion, said shank being provided with a lateral extension arranged within the body near the V-shaped recess, initially plastic anchoring material disposed within the forward portion of the body portion and surrounding said extension and having one end exposed at the front of the body and conforming to the outline of the V-shaped recess, and means at the front end of the shank for attachment to a fishing line.

JOHN E. BROWN.